US010291457B2

(12) United States Patent
Li et al.

(10) Patent No.: US 10,291,457 B2
(45) Date of Patent: May 14, 2019

(54) INFORMATION TRANSMISSION METHOD, A BASE STATION AND A TERMINAL (71) Applicant: Nanchong Coolpad Intelligent Technology Company Limited (CN), Nanchang, Jiangxi Province (CN)

(72) Inventors: Mingju Li, Nanchang (CN); Yajun Zhu, Nanchang (CN); Yunfei Zhang, Nanchang (CN)

(73) Assignee: NANCHANG COOLPAD INTELLECTUAL TECHNOLOGY COMPANY LIMITED, Nanchang, Jiangxi Province (CN)

( * ) Notice: Subject to any disclaimer, the term of this patent is extended or adjusted under 35 U.S.C. 154(b) by 8 days.

(21) Appl. No.: 15/795,683

(22) Filed: Oct. 27, 2017

(65) Prior Publication Data

US 2018/0159713 A1 Jun. 7, 2018

(30) Foreign Application Priority Data

Oct. 28, 2016 (CN) .......................... 2016 1 0972795

(51) Int. Cl.
*H04L 5/00* (2006.01)
*H04L 27/26* (2006.01)

(52) U.S. Cl.
CPC ........ *H04L 27/2666* (2013.01); *H04L 5/0048* (2013.01); *H04L 5/0053* (2013.01);
(Continued)

(58) Field of Classification Search
CPC . H04L 27/266; H04L 5/0048; H04L 27/2602; H04L 5/0078; H04L 5/0053;
(Continued)

(56) References Cited

U.S. PATENT DOCUMENTS

2011/0103243 A1* 5/2011 Larsson ................. H04L 5/001
370/252
2016/0020936 A1* 1/2016 Hu ...................... H04L 27/2657
375/260
(Continued)

FOREIGN PATENT DOCUMENTS

CN 106507439 A 3/2017

OTHER PUBLICATIONS

Lisbon, Portugal Oct. 2016, pp. 10-14, "Discussion on PSS/SSS/PBCH in numerology multiplexing" (Periodical), (3GPP TSG RAN WG1 Meeting #86bis).
(Continued)

*Primary Examiner* — Brandon J Miller
(74) *Attorney, Agent, or Firm* — Troutman Sanders LLP (57) ABSTRACT

The embodiments of the present disclosure disclose an information transmission method, a base station and a terminal. The method comprises: configuring at least one type of subcarrier spacing of synchronization signal and physical broadcast channel and symbol numbers occupied by the synchronization signal and the physical broadcast channel by a base station, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5; selecting one configuration for sending the synchronization signal and the physical broadcast channel according to a service time delay requirement; determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap; sending
(Continued)

the synchronization signal and the physical broadcast channel to a terminal according to the selected configuration and the determined frequency domain positions and time domain positions. By means of the present disclosure, the time delay of a terminal accessing a communication area can be reduced.

16 Claims, 4 Drawing Sheets

(52) U.S. Cl.
CPC .......... *H04L 5/0073* (2013.01); *H04L 5/0078* (2013.01); *H04L 27/2602* (2013.01); *H04L 27/2686* (2013.01); *H04L 5/0007* (2013.01); *H04L 5/0064* (2013.01)

(58) Field of Classification Search
CPC . H04L 27/2686; H04L 5/0073; H04L 5/0007; H04L 5/0064
See application file for complete search history.

(56) References Cited

U.S. PATENT DOCUMENTS

2016/0352551 A1* 12/2016 Zhang ................ H04L 27/2602
2018/0184390 A1* 6/2018 Wu ..................... H04L 27/2613

OTHER PUBLICATIONS

Lisbon, Portugal Oct. 2016, pp. 10-14, "Multi-beam SYNC design" (Periodical) (3GPP TSG RAN WG1 Meeting #86b).

Reno, USA Nov. 2018, pp. 14-18, "Discussion on the design for synchronization signal" (Periodical) (3GPP TSG RAN WG1 Meeting #87.

European Search Report dated Mar. 2, 2018, issued in connection with European Application No. EP17199174.8.

* cited by examiner

INFORMATION TRANSMISSION METHOD, A BASE STATION AND A TERMINAL

CROSS REFERENCE TO RELATED APPLICATIONS

This application claims the benefit of priority of the prior Chinese Patent Application No. 201610972795.1, filed on Oct. 28, 2016, the entire contents of which are incorporated herein by reference.

TECHNICAL FIELD

The present disclosure relates to the technical field of communication, and in particular relates to an information transmission method, a base station and a terminal.

BACKGROUND

With the continuous development of communication demands of users, people want their own needs to be responded to and dealt with more quickly. Under the conventional Long Term Evolution (LTE) technology, synchronization signal comprises Primary Synchronization Signal (PSS) and Secondary Synchronization Signal (SSS), both of which have a cycle period of 5 ms and are transmitted in sub-frames 0 and 5 at different symbols. A Physical Broadcast Channel (PBCH) mainly transmits the Master Information Block (MIB), which has a periodical transmission mode with a cycle period of 40 ms and is repeatedly transmitted for 4 times every 40 ms. The first transmission is sent at symbols 7, 8, 9, 10 of sub-frame 0 of a frame with a system frame serial number of 4, and the sub-frames 0 of the subsequent three frames repeat the content sent by the sub-frame 0 of the first frame. The content transmitted in the subsequent 40 ms may be different from that transmitted in the previous 40 ms. With regard to the frequency domain positions, the PSS/SSS and the PBCH are all transmitted in the central 6 Resource Blocks (RB), wherein, if the subcarrier spacing is 15 kHZ, each RB has 12 subcarriers, and 6RB have 72 subcarriers.

Because the transmission modes of synchronization signal and PBCH are very rigid and unitary in prior art, flexible and diversified time delay requirements in different scenes of future 5G services cannot be met, especially, the requirement for low time delay of some services cannot be met.

SUMMARY OF THE DISCLOSURE

The technical problem solved by embodiments of the present disclosure is how to provide an information transmission method and a base station in order to increase the efficiency for a terminal to access a community and reduce the access time delay.

In order to solve the above-mentioned technical problem, a first aspect of embodiments of the present disclosure provides an information transmission method that comprises:

configuring at least one type of subcarrier spacing of synchronization signal and physical broadcast channel and symbol numbers occupied by the synchronization signal and the physical broadcast channel by a base station, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

selecting one configuration for sending the synchronization signal and the physical broadcast channel according to a service time delay requirement;

determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

sending the synchronization signal and the physical broadcast channel to a terminal according to the selected configuration and the determined frequency domain positions and time domain positions.

Wherein, the step of configuring by a base station at least one type of subcarrier spacing of synchronized signal and physical broadcast channel and symbol numbers occupied by the synchronization signal and the physical broadcast channel comprises:

configuring at least one type of subcarrier spacing of synchronization signal and physical broadcast channel and symbol numbers occupied by the synchronization signal and the physical broadcast channel by the base station.

Wherein, the time domain positions for sending the synchronization signal and the physical broadcast channel at different carrier frequencies overlap or partially overlap to the greatest extent.

A second aspect of embodiments of the present disclosure provides a base station that comprises:

a configuration unit, for configuring at least one type of subcarrier spacing of synchronization signal and physical broadcast channel and symbol numbers occupied by the synchronization signal and the physical broadcast channel, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

a selecting unit, for selecting one configuration for sending the synchronization signal and the physical broadcast channel according to a service time delay requirement;

a determining unit, for determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

a sending unit, for sending the synchronization signal and the physical broadcast channel to a terminal according to the selected configuration and the determined frequency domain positions and time domain positions.

Wherein, the configuration unit is for configuring at least one type of subcarrier spacing of synchronization signal and physical broadcast channel and symbol numbers occupied by the synchronization signal and the physical broadcast channel for each carrier frequency.

Wherein, the time domain positions for sending the synchronization signal and the physical broadcast channel at different carrier frequencies overlap or partially overlap to the greatest extent.

Wherein, for the time domain positions for sending the synchronization signal and the physical broadcast channel at different carrier frequencies,
the starting time points are the same; or
the finishing time points are the same; or
the middle time points are the same; or
based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

Wherein, the frequency domain positions for sending the synchronization signal and the physical broadcast channel are one or more resource blocks with no less than 1.08 MHz and no more than the minimal bandwidth supported by the base station, at least one of the resource blocks is at a band width central position.

Wherein, the frequency domain positions for sending the synchronization signal and the physical broadcast channel at different carrier frequencies overlap or partially overlap to the greatest extent.

Wherein, for the frequency domain positions for sending the synchronization signal and the physical broadcast channel at different carrier frequencies,
the starting frequency points are the same; or
the finishing frequency points are the same; or
the middle frequency points are the same.

Wherein, if the carrier is an unauthorized carrier, the sending unit is for detecting whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

Wherein, after the determining unit determines the frequency domain positions and time domain positions for sending the synchronization signal and the physical broadcast channel, the configuration unit is for generating a mapping term of subcarrier spacing, time length, starting time point, bandwidth size and starting frequency point for each configuration; the sending unit is for combining the generated mapping terms into a mapping table to be sent to the terminal for storage.

Wherein, if the sending unit sends the synchronization signal and the physical broadcast channel by using multiple beams, each of the beams performs transmission independently.

Wherein, if at least two beams used by the sending unit have different time domains for transmission, the configuration unit is for assigning serial numbers to time blocks corresponding to the time domain positions determined; when each of the beams performs transmission, the sending unit is for sending transmission that carries serial number information of the time block where the beam is located.

Wherein, if the base station works independently, a mapping table of resource information of random access channel and physical random access channel in relation with the space time frequency code information for sending the synchronization signal and the physical broadcast channel are stored in the terminal, and when the synchronization signal and the physical broadcast channel are received by the terminal, the terminal acquires the corresponding resource information of random access channel and physical random access channel by looking up the mapping table;
or
the sending unit is for transmitting the resource information of random access channel and physical random access channel through the physical broadcast channel.

Wherein, the subcarrier spacing of the physical broadcast channel is larger than or equal to the subcarrier spacing of the synchronization signal at the same carrier frequency.

A third aspect of embodiments of the present disclosure provides a base station that comprises a processor, a memory and a transceiver interconnected by a bus line, wherein, the transceiver is for transmitting information and data between the base station and a terminal, the memory is for storing a group of program codes, the processor is for calling the program codes stored in the memory to execute the following operation steps:

configuring at least one type of subcarrier spacing of synchronization signal and physical broadcast channel and symbol numbers occupied by the synchronization signal and the physical broadcast channel, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

selecting one configuration for sending the synchronization signal and the physical broadcast channel according to a service time delay requirement;

determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

sending the synchronization signal and the physical broadcast channel to a terminal according to the selected configuration and the determined frequency domain positions and time domain positions.

Wherein, the synchronization signal comprises primary synchronization signal and secondary synchronization signal, the primary synchronization signal occupies one symbol, the secondary synchronization signal occupies one symbol,
the symbol occupied by the secondary synchronization signal is a previous and neighboring symbol of the symbol occupied by the primary synchronization signal;
or
the symbol occupied by the secondary synchronization signal is the same as that occupied by the primary synchronization signal.

Wherein, the physical broadcast channel occupies no more than 4 symbols, a starting symbol of the time domain for sending the physical broadcast channel is the $x^{th}$ symbol after the symbol for sending the secondary synchronization signal, wherein, X is 0 or 1.

Wherein, length of unit symbols occupied by the primary synchronization signal, the secondary synchronization signal and the physical broadcast channel is determined by the subcarrier spacings configured, and if the subcarrier spacing of the primary synchronization signal and secondary synchronization signal is $15 \times 2^m$ kHz, the length of the unit symbol occupied by the primary synchronization signal and secondary synchronization signal is $1/(14 \times 2^m)$ milliseconds; if the subcarrier spacing of the physical broadcast channel is $15 \times 2^n$ kHz, the length of the unit symbol occupied by the physical broadcast channel is $1/(14 \times 2^n)$ milliseconds.

Wherein, the processor is for configuring at least one type of subcarrier spacing of synchronization signal and physical broadcast channel and symbol numbers occupied by the synchronization signal and the physical broadcast channel for each carrier frequency.

Wherein, the time domain positions for sending the synchronization signal and the physical broadcast channel at different carrier frequencies overlap or partially overlap to the greatest extent.

Wherein, for the time domain positions for sending the synchronization signal and the physical broadcast channel at different carrier frequencies, the starting time points are the same; or
the finishing time points are the same; or
the middle time points are the same; or
based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

Wherein, the frequency domain positions for sending the synchronization signal and the physical broadcast channel are one or more resource blocks with no less than 1.08 MHz and no more than the minimal bandwidth supported by the base station, at least one of the resource blocks is at a hand width central position.

Wherein, the frequency domain positions for sending the synchronization signal and the physical broadcast channel at different carrier frequencies overlap or partially overlap to the greatest extent.

Wherein, for the frequency domain positions for sending the synchronization signal and the physical broadcast channel at different carrier frequencies, the starting frequency points are the same; or
the finishing frequency points are the same; or
the middle frequency points are the same.

Wherein, if the carrier is an unauthorized carrier, the processor is for detecting whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

Wherein, after determining the frequency domain positions and time domain positions for sending the synchronization signal and the physical broadcast channel, the processor is for generating a mapping term of subcarrier spacing, time length, starting time point, bandwidth size and starting frequency point for each configuration;

combining the generated mapping terms into a mapping table to be sent to the terminal for storage.

Wherein, if the synchronization signal and the physical broadcast channel are sent by using multiple beams, each of the beams performs transmission independently.

Wherein, if at least two beams use different time domains for transmission, the processor is for assigning serial numbers to time blocks corresponding to the time domain positions determined; when each of the beams performs transmission, serial number information of the time block where the beam is located is carried.

Wherein, if the base station works independently, a mapping table of resource information of random access channel and physical random access channel in relation with the space time frequency code information for sending the synchronization signal and the physical broadcast channel are stored in the terminal, and when the synchronization signal and the physical broadcast channel are received by the terminal, the terminal acquires the corresponding resource information of random access channel and physical random access channel by looking up the mapping table;

or the processor is for transmitting the resource information of random access channel and physical random access channel through the physical broadcast channel.

Wherein, the subcarrier spacing of the physical broadcast channel is larger than or equal to the subcarrier spacing of the synchronization signal at the same carrier frequency.

A fourth aspect of embodiments of the present disclosure provides a synchronization method that comprises:

receiving synchronization signal and physical broadcast channel sent by a base station through a terminal, wherein, the subcarrier spacings and occupied symbol numbers of the received synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table;

detecting the frequency domain positions and time domain positions of the received synchronization signal and physical broadcast channel through the terminal, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal; completing downlink sub-frame synchronization according to the determined sub-frame boundary and symbol boundary with which the synchronization signal is sent.

A fifth aspect of embodiments of the present disclosure provides a terminal that comprises:

a receiving unit, for receiving synchronization signal and physical broadcast channel sent by a base station, wherein, the subcarrier spacings and occupied symbol numbers of the synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table;

a detecting unit, for detecting the frequency domain positions and time domain positions of the received synchronization signal and physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

a determining unit, for determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal;

a synchronization unit, for completing downlink sub-frame synchronization according to the determined sub-frame boundary and symbol boundary with which the synchronization signal is sent.

A sixth aspect of embodiments of the present disclosure provides a terminal that comprises a processor, a memory and an interface circuit interconnected by a bus line, wherein, the memory is for storing a group of program codes, the processor is for calling the program codes stored in the memory to execute the following operation steps:

using the interface circuit to receive synchronization signal and physical broadcast channel sent by a base station, wherein, the subcarrier spacings and occupied symbol numbers of the synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth site and starting frequency point, and multiple mapping terms are combined into a mapping table;

detecting the frequency domain positions and time domain positions of the received synchronization signal and physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal; completing downlink sub-frame synchronization according to the determined sub-frame boundary and symbol boundary with which the synchronization signal is sent.

By implementing the embodiments of the present disclosure, the following advantageous effects are achieved:

by configuring multiple types of subcarrier spacings and occupied symbol numbers to be selected from, the response flexibility when facing different services is improved, and the flexibility of resource utilization is improved; because the time domain positions and frequency domain positions thereof are relatively close to each other or even partially overlap or completely overlap, the terminal can quickly receive the two kind of information, quickly complete the search and synchronization for a community, so that the access time delay is reduced, which can be applied to various scenes and bring better using experience for users.

BRIEF DESCRIPTION OF THE DRAWINGS

In order to more clearly describe the technical solutions in the embodiments of the present disclosure or in the prior art, hereinafter, the accompanying drawings required to be used for describing the embodiments or the prior art will be briefly introduced. Apparently, the accompanying drawings described below are only directed to some embodiments of the present disclosure, and for a person skilled in the art, without expenditure of creative labor, other drawings can be derived on the basis of these accompanying drawings.

DETAILED DESCRIPTION OF EMBODIMENTS

A clear and complete description of the technical solutions of the embodiments of the present disclosure is given below, in conjunction with the accompanying drawings. Apparently, the embodiments described below are part of, but not all of, the embodiments of the present disclosure. All the other embodiments, obtained by a person skilled in the art on the basis of the embodiments described in the present disclosure without expenditure of creative labor, belong to the protection scope of the present disclosure.

Figure 1:
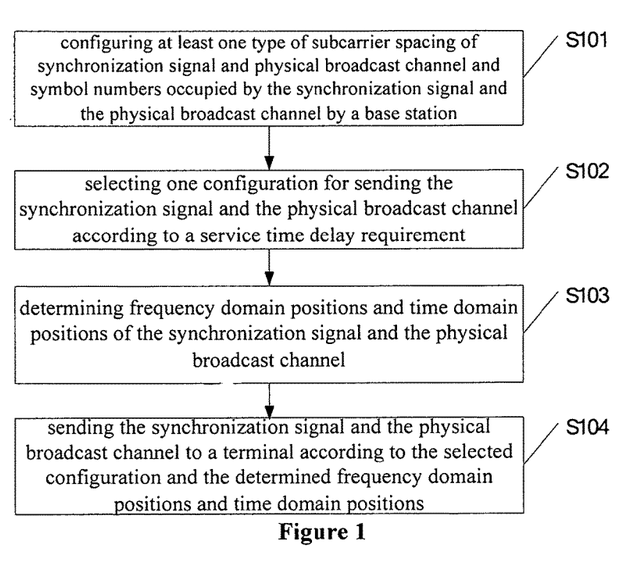
FIG. 1 is a flow chart of a first embodiment of the information transmission method of the present disclosure.

Referring to FIG. 1 which is a flow chart of a first embodiment of the information transmission method of the present disclosure, in this embodiment, the method comprises the following steps:

S101, configuring at least one type of subcarrier spacing of synchronization signal and physical broadcast channel and symbol numbers occupied by the synchronization signal and the physical broadcast channel by a base station.

Wherein, the subcarrier spacing of the synchronization signal is $15 \times 2^m$ kHz, the subcarrier spacing of the physical broadcast channel is $15 \times 2^n$ kHz, m and n are both integers in a range of 0 to 5.

The information contained in the Physical Broadcast Channel (PBCH) is system information such as Master Information Block (MIB) and random access information.

Specifically, the synchronization signal comprises Primary Synchronization Signal (PSS) and Secondary Synchronization Signal (SSS), the primary synchronization signal occupies one symbol, the secondary synchronization signal occupies one symbol, the symbol occupied by the secondary synchronization signal is a previous and neighboring symbol of the symbol occupied by the primary synchronization signal;

or the symbol occupied by the secondary synchronization signal is the same as that occupied by the primary synchronization signal. For example, the SSS occupies the 6th symbol in the sub-frame 0, and the PSS occupies the 7th symbol in the sub-frame 0; or, the SSS and PSS both occupy the 6th symbol or the 7th symbol.

The physical broadcast channel occupies no more than 4 symbols, a starting symbol of the time domain for sending the physical broadcast channel is the $x^{th}$ symbol after the symbol for sending the secondary synchronization signal, wherein, X is 0 or 1.

Length of unit symbols occupied by the primary synchronization signal, the secondary synchronization signal and the physical broadcast channel is determined by the subcarrier spacings configured, and if the subcarrier spacing of the primary synchronization signal and secondary synchronization signal is $15 \times 2^m$ kHz, the length of the unit symbol occupied by the primary synchronization signal and secondary synchronization signal is $1/(14 \times 2^m)$ milliseconds; if the subcarrier spacing of the physical broadcast channel is $15 \times 2^n$ kHz, the length of the unit symbol occupied by the physical broadcast channel is $1/(14 \times 2^n)$ milliseconds.

It should be noted that, the above-mentioned one symbol occupied by the PSS/SSS and the above-mentioned 4 symbols occupied by the PBCH refer to one PSS/SSS sending block and one PBCH sending block. One sending burst may contain multiple PSS/SSS sending blocks and multiple PBCH sending blocks, wherein, each PSS/SSS sending block is able to individually perform a function of sending PSS/SSS, and each PBCH sending block is able to individually perform a function of sending PBCH.

Because there may exist multiple carrier frequencies used by the base station, the base station can be configured at least one type of subcarrier spacing of synchronization signal and physical broadcast channel and symbol numbers occupied by the synchronization signal and the physical broadcast channel for each carrier frequency.

S102, selecting one from the at least one type of configuration for sending the synchronization signal and the physical broadcast channel according to a service time delay requirement.

For some services, since short time delay is highly required, a terminal is required to access a community quickly. For some other services, short time delay is not highly required, and thus slower processing can be adopted. Accordingly, the base station can selecting one from a plurality of configurations for sending the synchronization signal and the physical broadcast channel according to the time delay requirement of a particular service, so as to meet various terminal requirements.

S103, determining frequency domain positions and time domain positions of the synchronization signal and the physical broadcast channel.

Optionally, the frequency domain positions for sending the synchronization signal and the physical broadcast channel are neighboring each other or at least partially overlap, the time domain positions for sending the synchronization signal and the physical broadcast channel are neighboring each other or partially overlap.

That is to say, for frequency domain, neighboring frequency domain positions are selected for sending the synchronization signal and the physical broadcast channel, or, partially or completely overlapping frequency domain positions are selected for sending the synchronization signal and the physical broadcast channel. For time domain, neighboring or overlapping time domain positions are selected for sending the synchronization signal and the physical broadcast channel.

Optionally, the time domain positions for sending the synchronization signal and the physical broadcast channel at different carrier frequencies overlap or partially overlap to the greatest extent.

Figure 2:
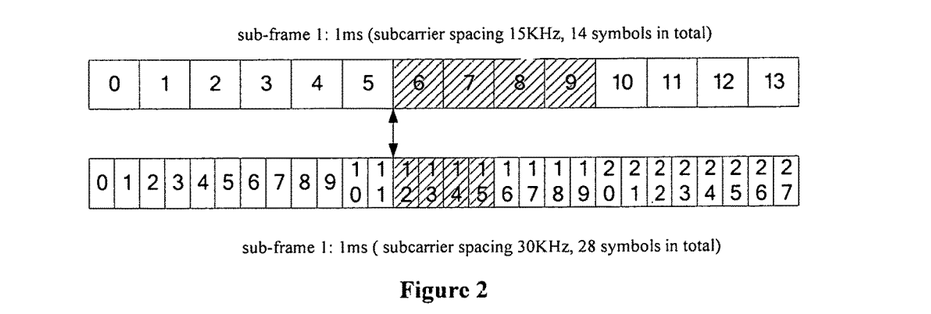
FIG. 2 is a schematic diagram of over lapped time domain parts in the information transmission method of the present disclosure.

Specifically, as the subcarrier spacings used by the synchronization signal and the physical broadcast channel are different, the corresponding occupied symbol lengths are different. For time domain positions, it may be configured that the starting time points are the same, and because different symbol lengths lead to different sending time lengths, the finishing time points are different. In particular, as shown in FIG. 2, with respect to the PSS, SSS and PBCH sent in a sub-frame 1, the subcarrier spacing is 15 kHz, the sub-frame 1 contains 14 symbols. When a sending block composed of the PSS, SSS and PBCH is transmitted at symbols 6, 7, 8, 9 (the dashed area of the sub-frame shown in the upper part), the sending time length is 4/14 ms, and the starting time point is at the 6/14 ms point. When the base station selects another subcarrier spacing for sending these information, because the subcarrier spacing changes to 30 kHz, the sub-frame 1 contains 28 symbols, each symbol occupies 1/28 ms, under such conditions, the sending block composed of the PSS, SSS and PBCH also starts to be transmitted at the 6/14 ms point, i.e. the 12/28 ms point, and also occupies 4 symbols for sending, i.e. the transmission is completed at symbols 12, 13, 14, 15 (the dashed area of the sub-frame shown in the lower part), and as the symbol length shortens with unchanged symbol numbers, the sending time length changes to 4/28 ms. Therefore, with different subcarrier spacings, the transmission can be started at the same starting time point (the time point shown by the double-headed arrow), but finished at different finishing time points. And because the sending time length shortens, the time delay for the terminal to search for, synchronize with and access a community is reduced. The sending time periods of PSS, SSS and PBCH sent with different subcarrier spacings overlap to the greatest extent such that the shortest sending time period is contained within the longer time periods, which helps the terminal to detect. The time delay thereof can be greatly reduced by the time overlap.

Or, similarly, the following modes can be used:

The finishing time points are the same, with different starting time points;

or the middle time points are the same, with different starting time points and finishing time points; for example, the middle time point is the 0.5 ms point of a 1 ms sub-frame, if the sending time length is 0.2 ms, the starting time point is the 0.4 ms point and the finishing time point is the 0.6 ms point; if the sending time length is 0.1 ms, the starting time point is the 0.45 ms point and the finishing time point is the 0.55 ms point.

or based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

The above-mentioned time domain overlap modes have similar principles, the only differences are their specific overlapping positions, which is not discussed repeatedly herein.

Figure 3:
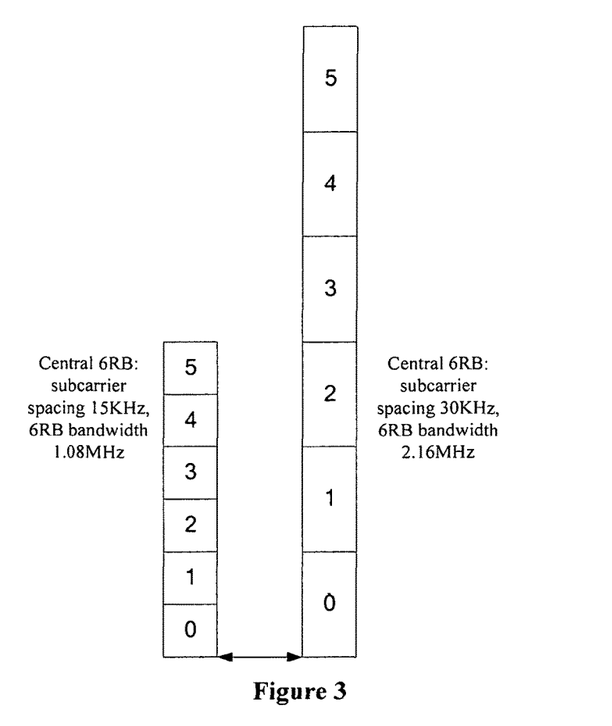
FIG. 3 is a schematic diagram of overlapped frequency domain parts in the information transmission method of the present disclosure.

In the aspect of frequency domain, the frequency domain positions for sending the synchronization signal and the physical broadcast channel are one or more resource blocks with no less than 1.08 MHz and no more than the minimal bandwidth supported by the base station, at least one of the resource blocks is at a band width central position.

This segment of bandwidth for sending the information may be called a transmittable bandwidth. There is defined an actual sending bandwidth within the transmittable bandwidth, which is narrower than the transmittable bandwidth but is also no less than 6 RBs. One RB has 12 subcarriers, so the size of an RB depends on the subcarrier spacing. The actual sending bandwidth position occupied by the PBCH may be the same as that occupied by the PSS/SSS; and the actual sending bandwidth position occupied by the PBCH may be different from that occupied by the PSS/SSS. The frequency domain positions for sending the synchronization signal and the physical broadcast channel with different subcarrier spacings overlap or partially overlap to the greatest extent.

Specifically, for the frequency domain positions, the starting frequency points are the same, with different finishing frequency points. In particular, as shown in FIG. 3, the signal is sent on the subcarriers of the central 6RB (in order to help the description, the RBs before and after the central 6RB are not shown, and the central 6RB are assigned with numbers 0-5, which does not represent the actual serial number and position). When the subcarrier spacing is 15 kHz, the bandwidth occupied for sending the PSS, SSS and PBCH is 1.08 MHz (the shorter 6RB part on the left); and when the subcarrier spacing is 30 kHz, the bandwidth occupied for sending the PSS, SSS and PBCH is 2.16 MHz (the 6RB part on the right, which is 2 times the length of the left part). The two parts have the same transmission starting frequency point (the point shown by the double-headed arrow), but with different subcarrier spacings, the transmission finishing frequency points are different. It is configured that the narrowest sending bandwidth is contained within the longer sending bandwidths, which likewise helps terminal to detect and reduces the processing time delay.

Or, similarly, the following modes can be used:

the finishing frequency points are the same, with different starting frequency points;

or the middle frequency points are the same, with different starting frequency points and finishing frequency points.

The overlapping of the above-mentioned frequency domain have similar principles, the only difference is the specific occupied bandwidth overlapping positions, which is not discussed repeatedly herein.

S104, sending the synchronization signal and the physical broadcast channel to a terminal according to the selected configuration and the determined frequency domain positions and time domain positions.

When the subcarrier spacings and occupied symbol numbers have been selected, in combination of the determined frequency domain positions and time domain positions, the synchronization signal and the physical broadcast channel can be sent to the terminal accordingly.

Optionally, if the carrier is an unauthorized carrier, the base station detects whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

Optionally, in order to help the terminal performs downlink sub-frame synchronization better, a mapping table of sending time length, starting time point, sending bandwidth size and starting frequency point in relation with subcarrier spacing may be pre-stored in the terminal, so that when the terminal receives the signal sent by the base station, the terminal can determine a sub-frame boundary by looking up the mapping table;

or the base station generates a mapping term of subcarrier spacing, sending time length, starting time point, sending bandwidth size and starting frequency point for each configuration; and then, the base station combines the generated mapping terms into a mapping table and sends the mapping table to the terminal for storage; subsequently, the terminal can look up the mapping table after receiving the information.

Optionally, if the synchronization signal and the physical broadcast channel are sent by using multiple beams, each of the beams performs transmission independently, that is to say, the frequency domain positions and time domain positions for each beam may be different, or may be the same, which is not limited in any way by embodiments of the present disclosure.

If at least two beams use different time domains for transmission, serial numbers are assigned to time blocks corresponding to the time domain positions determined; when each of the beams performs transmission, serial number information of the time block where the beam is located is carried.

This is because, if the PSS/SSS/PBCH is sent on the basis of multiple beams, and the multiple beams perform transmission at different time, for example, the multiple beams are distributed in several continuous symbols of a sub-frame, then a user in one direction can only receive the PSS/SSS/PBCH sent by one of the beams, and if the user does not know this beam is sent on which symbol, then the user cannot determine the sub-frame boundary. Therefore, it is provided that, when the PSS/SSS/PBCH is sent on the basis of multiple beams, each beam should notify its sequence number, so that, as a result, the user knows the symbol position for sending the PSS/SSS/PBCH by the first beam as well as the time length for sending the PSS/SSS/PBCH by each beam, and thus the symbol position of the PSS/SSS/PBCH of the received beam can be deduced, thereby the sub-frame boundary can be further calculated, for achieving sub-frame synchronization.

Optionally, the above-mentioned serial number information may be stored in the mapping table sent to the terminal, or directly pre-stored in the terminal.

Furthermore, if the base station performs carrier aggregation or bidirectional connection with an LTE community, the Random Access Channel (RACH), Physical Random Access Channel (PRACH) and lead code of the base station can be notified by the main LTE community. But if the base station works independently, the random access resource and physical random access resource in conventional LTE need to be broadcasted to users through system information SIB2. In consideration for reducing time delay, a mapping table of resource information of random access channel and physical random access channel in relation with the space time frequency code information for sending the synchronization signal and the physical broadcast channel can be stored in a chip of the terminal, so that, when the synchronization signal and the physical broadcast channel are received by the terminal, the terminal can acquire the corresponding resource information of random access channel and physical random access channel by looking up the mapping table;

or the base station transmits the resource information of random access channel and physical random access channel through the physical broadcast channel.

Thus, in such a scene, the method of this embodiment can be utilized to reduce time delay.

In this embodiment, by configuring multiple types of subcarrier spacings and occupied symbol numbers to be selected from, the response flexibility when facing different services is improved, and the flexibility of resource utilization is improved; because the time domain positions and frequency domain positions thereof are relatively close to each other or even partially overlap or completely overlap, the terminal can quickly receive the two kind of information, quickly complete the search and synchronization for a community, so that the access time delay is reduced, which can be applied to various scenes and bring better using experience for users.

Figure 4:
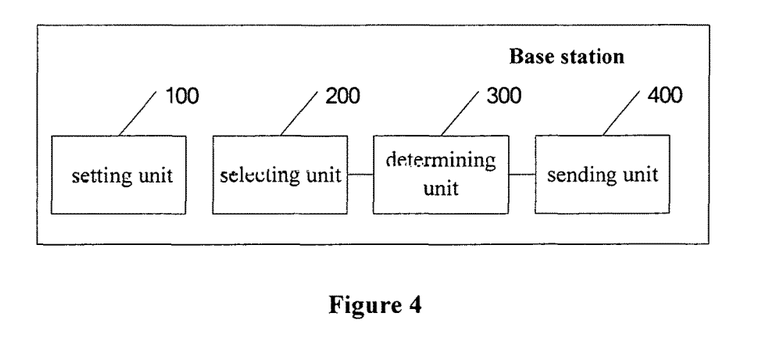
FIG. 4 is a component schematic diagram of a first embodiment of the base station of the present disclosure.

Referring to FIG. 4 which is a component schematic diagram of a first embodiment of the base station of the present disclosure, in this embodiment, the base station comprises:

a configuration unit 100, for configuring at least one type of subcarrier spacing of synchronization signal and physical broadcast channel and symbol numbers occupied by the synchronization signal and the physical broadcast channel, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

a selecting unit 200, for selecting one configuration for sending the synchronization signal and the physical broadcast channel according to a service time delay requirement;

a determining unit 300, for determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

a sending unit 400, for sending the synchronization signal and the physical broadcast channel to a terminal according to the selected configuration and the determined frequency domain positions and time domain positions.

Optionally, the synchronization signal comprises primary synchronization signal and secondary synchronization signal, wherein, the primary synchronization signal occupies one symbol, the secondary synchronization signal occupies one symbol, the symbol occupied by the secondary synchronization signal is a previous and neighboring symbol of the symbol occupied by the primary synchronization signal;

or the symbol occupied by the secondary synchronization signal is the same as that occupied by the primary synchronization signal.

Optionally, the physical broadcast channel occupies no more than 4 symbols, a starting symbol of the time domain for sending the physical broadcast channel is the $x^{th}$ symbol after the symbol for sending the secondary synchronization signal, wherein, X is 0 or 1.

Length of unit symbols occupied by the primary synchronization signal, the secondary synchronization signal and the physical broadcast channel is determined by the subcarrier spacings configured, and if the subcarrier spacing of the primary synchronization signal and secondary synchronization signal is $15 \times 2^m$ kHz, the length of the unit symbol occupied by the primary synchronization signal and secondary synchronization signal is $1/(14 \times 2^m)$ milliseconds; if the subcarrier spacing of the physical broadcast channel is $15 \times 2^n$ kHz, the length of the unit symbol occupied by the physical broadcast channel is $1/(14 \times 2^n)$ milliseconds.

Optionally, the configuration unit 100 is for configuring at least one type of subcarrier spacing of synchronization signal and physical broadcast channel and symbol numbers occupied by the synchronization signal and the physical broadcast channel for each carrier frequency.

The subcarrier spacing of the physical broadcast channel is larger than or equal to the subcarrier spacing of the synchronization signal at the same carrier frequency.

The frequency domain positions for sending the synchronization signal and the physical broadcast channel at different carrier frequencies overlap or partially overlap to the greatest extent.

For the time domain positions of sending transmission,
the starting time points are the same; or
the finishing time points are the same; or
the middle time points are the same; or
based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

The frequency domain positions for sending the synchronization signal and the physical broadcast channel are one or more resource blocks with no less than 1.08 MHz and no more than the minimal bandwidth supported by the base station, at least one of the resource blocks is at a band width central position.

The frequency domain positions for sending the synchronization signal and the physical broadcast channel at different carrier frequencies overlap or partially overlap to the greatest extent.

For the frequency domain positions of sending transmission,
the starting frequency points are the same; or
the finishing frequency points are the same; or
the middle frequency points are the same.

Optionally, if the carrier is an unauthorized carrier, the sending unit is for detecting whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

After the determining unit 300 determines the frequency domain positions and time domain positions for sending the synchronization signal and the physical broadcast channel, the configuration unit 100 is for generating a mapping term of subcarrier spacing, time length, starting time point, bandwidth size and starting frequency point for each configuration;

the sending unit 400 is for combining the generated mapping terms into a mapping table to be sent to the terminal for storage.

If the sending unit 400 sends the synchronization signal and the physical broadcast channel by using multiple beams, each of the beams performs transmission independently.

Optionally, if at least two beams used by the sending unit 400 have different time domains for transmission, the configuration unit 100 is for assigning serial numbers to time blocks corresponding to the time domain positions determined; when each of the beams performs transmission, the sending unit is for sending transmission that carries serial number information of the time block where the beam is located.

Optionally, if the base station works independently, a mapping table of resource information of random access channel and physical random access channel in relation with the space time frequency code information for sending the synchronization signal and the physical broadcast channel are stored in the terminal, and when the synchronization signal and the physical broadcast channel are received by the terminal, the terminal acquires the corresponding resource information of random access channel and physical random access channel by looking up the mapping table;

or the sending unit 400 is for transmitting the resource information of random access channel and physical random access channel through the physical broadcast channel.

The above described configuration unit 100, selecting unit 200, determining unit 300 and sending unit 400 may exist individually, or may be integrated together. The configuration unit 100, selecting unit 200, determining unit 300 or sending unit 400 may be provided in hardware form independently from the processor of the base station, as an individual microprocessor; they may also be embedded in hardware form within the processor of the base station, or may be stored in software form within the processor of the base station, so as to make it convenient for the processor of the base station to call and execute the operation steps corresponding to the configuration unit 100, selecting unit 200, determining unit 300 and sending unit 400.

For example, in the first embodiment of the base station of the present disclosure (the embodiment shown in FIG. 4), the configuration unit 100 is a processor of the base station, the function of the selecting unit 200, determining unit 300 and sending unit 400 may be embedded within the processor, or may be provided independently from the processor, or may be stored in software form within the processor for the processor to call and execute their function, which is not limited in any way by embodiments of the present disclosure. The above-mentioned processor may be a Central Processing Unit (CPU), a microprocessor or a single chip microcomputer.

Figure 5:
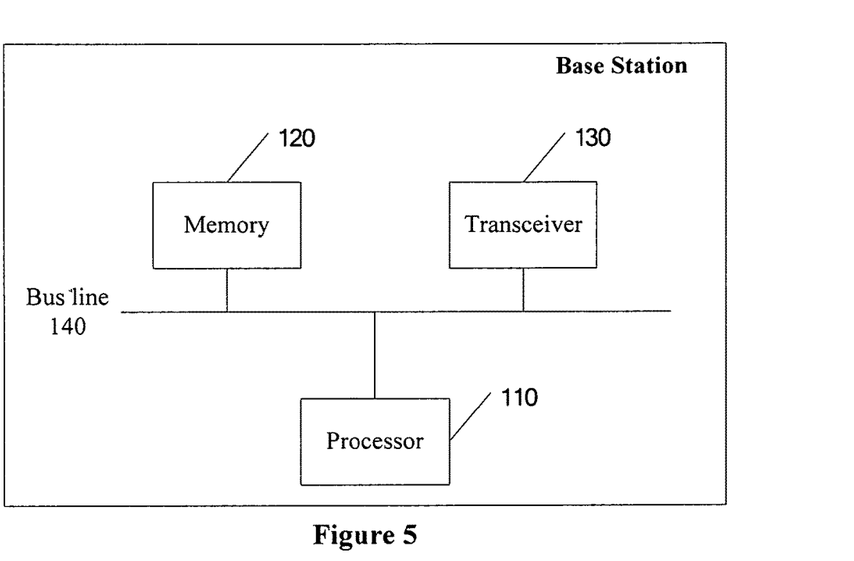
FIG. 5 is a component schematic diagram of a second embodiment of the base station of the present disclosure.

Referring to FIG. 5 which is a component schematic diagram of a second embodiment of the base station of the present disclosure, in this embodiment, the base station comprises: a processor 110, a memory 120 and a transceiver 130 interconnected by a bus line 140, wherein, the transceiver 130 is for transmitting information and data between the base station and a terminal, the memory 120 is for storing a group of program codes, the processor 110 is for calling the program codes stored in the memory 120 to execute the following operation steps:

configuring at least one type of subcarrier spacing of synchronization signal and physical broadcast channel and symbol numbers occupied by the synchronization signal and the physical broadcast channel, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

selecting one configuration for sending the synchronization signal and the physical broadcast channel according to a service time delay requirement;

determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

sending the synchronization signal and the physical broadcast channel to a terminal according to the selected configuration and the determined frequency domain positions and time domain positions.

Specifically, the synchronization signal comprises primary synchronization signal and secondary synchronization signal, the primary synchronization signal occupies one symbol, the secondary synchronization signal occupies one symbol, the symbol occupied by the secondary synchronization signal is a previous and neighboring symbol of the symbol occupied by the primary synchronization signal;

or the symbol occupied by the secondary synchronization signal is the same as that occupied by the primary synchronization signal.

The physical broadcast channel occupies no more than 4 symbols, a starting symbol of the time domain for sending the physical broadcast channel is the $x^{th}$ symbol after the symbol for sending the secondary synchronization signal, wherein, X is 0 or 1.

Length of unit symbols occupied by the primary synchronization signal, the secondary synchronization signal and the physical broadcast channel is determined by the subcarrier spacings configured, and if the subcarrier spacing of the primary synchronization signal and secondary synchronization signal is $15 \times 2^m$ kHz, the length of the unit symbol occupied by the primary synchronization signal and secondary synchronization signal is $1/(14 \times 2^m)$ milliseconds; if the subcarrier spacing of the physical broadcast channel is $15 \times 2^n$ kHz, the length of the unit symbol occupied by the physical broadcast channel is $1/(14 \times 2^n)$ milliseconds.

The processor 110 is for configuring at least one type of subcarrier spacing of synchronization signal and physical broadcast channel and symbol numbers occupied by the synchronization signal and the physical broadcast channel for each carrier frequency.

The subcarrier spacing of the physical broadcast channel is larger than or equal to the subcarrier spacing of the synchronization signal at the same carrier frequency.

The time domain positions for sending the synchronization signal and the physical broadcast channel at different carrier frequencies overlap or partially overlap to the greatest extent.

Optionally, for the time domain positions of sending transmission, the starting time points are the same; or the finishing time points are the same; or the middle time points are the same; or based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

Optionally, the frequency domain positions for sending the synchronization signal and the physical broadcast channel are one or more resource blocks with no less than 1.08 MHz and no more than the minimal bandwidth supported by the base station, at least one of the resource blocks is at a band width central position.

The frequency domain positions for sending the synchronization signal and the physical broadcast channel at different carrier frequencies overlap or partially overlap to the greatest extent.

Optionally, for the frequency domain positions of sending transmission,
the starting frequency points are the same; or
the finishing frequency points are the same; or
the middle frequency points are the same.

Optionally, if the carrier is an unauthorized carrier, the processor is for detecting whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

After determining the frequency domain positions and time domain positions for sending the synchronization signal and the physical broadcast channel, the processor 110 is for generating a mapping term of subcarrier spacing, time length, starting time point, bandwidth size and starting frequency point for each configuration; and combining the generated mapping terms into a mapping table to be sent to the terminal for storage.

If the synchronization signal and the physical broadcast channel are sent by using multiple beams, each of the beams performs transmission independently.

Optionally, if at least two beams use different time domains for transmission, the processor 110 is for assigning serial numbers to time blocks corresponding to the time domain positions determined; when each of the beams performs transmission, serial number information of the time block where the beam is located is carried.

If the base station works independently, a mapping table of resource information of random access channel and physical random access channel in relation with the space time frequency code information for sending the synchronization signal and the physical broadcast channel are stored in the terminal, and when the synchronization signal and the physical broadcast channel are received by the terminal, the terminal acquires the corresponding resource information of random access channel and physical random access channel by looking up the mapping table;

or the processor is for transmitting the resource information of random access channel and physical random access channel through the physical broadcast channel.

Figure 6:
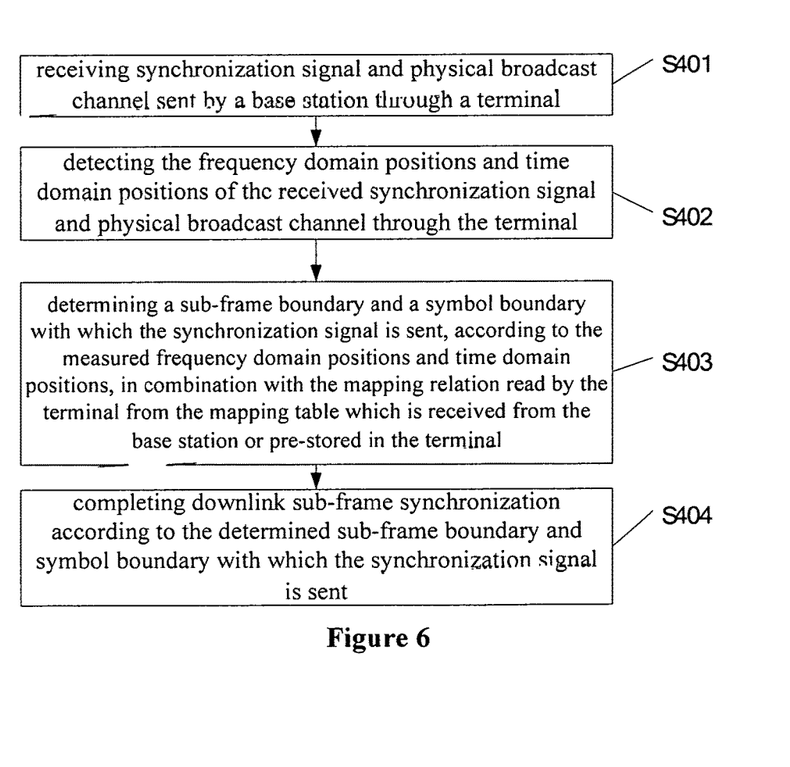
FIG. 6 is a flow chart of a first embodiment of the synchronization method of the present disclosure.

Referring to FIG. 6 which is a flow chart of a first embodiment of the synchronization method of the present disclosure, in this embodiment, the method comprises the following steps:

S601, receiving synchronization signal and physical broadcast channel sent by a base station through a terminal.

Wherein, the subcarrier spacings and occupied symbol numbers of the synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table.

S602, detecting the frequency domain positions and time domain positions of the received synchronization signal and physical broadcast channel through the terminal.

Wherein, the frequency domain positions for sending the synchronization signal and the physical broadcast channel are neighboring each other or at least partially overlap, the time domain positions for sending the synchronization signal and the physical broadcast channel are neighboring each other or partially overlap.

S603, determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal.

S604, completing downlink sub-frame synchronization according to the determined sub-frame boundary and symbol boundary with which the synchronization signal is sent.

Because the base station configures multiple types of subcarrier spacings and occupied symbol numbers, a particular configuration can be flexibly selected therefrom according to the service of the terminal; the synchronization signal and the physical broadcast channel are sent closely to each other, which is beneficial for the terminal to search for, synchronize with and access a community, so that the processing time delay of the terminal is reduced and the efficiency for the terminal to access a community is improved.

Figure 7:
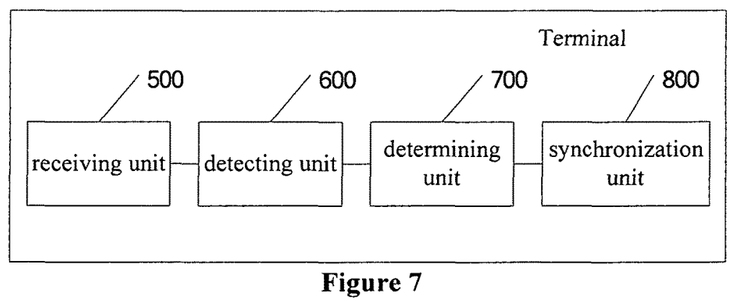
FIG. 7 is a component schematic diagram of a first embodiment of the terminal of the present disclosure.

Referring to FIG. 7 which is a component schematic diagram of a first embodiment of the terminal of the present disclosure, in this embodiment, the terminal comprises:

a receiving unit 500, for receiving synchronization signal and physical broadcast channel sent by a base station, wherein, the subcarrier spacings and occupied symbol numbers of the synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table;

a detecting unit 600, for detecting the frequency domain positions and time domain positions of the received synchronization signal and physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

a determining unit 700, for determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal;

a synchronization unit 800, for completing downlink sub-frame synchronization according to the determined sub-frame boundary and symbol boundary with which the synchronization signal is sent.

The above described receiving unit 500, detecting unit 600, determining unit 700 and synchronization unit 800 may exist individually, or may be integrated together. The receiving unit 500, detecting unit 600, determining unit 700 or synchronization unit 800 may be provided in hardware form independently from the processor of the terminal, as an individual microprocessor; they may also be embedded in hardware form within the processor of the terminal, or may be stored in software form within the processor of the terminal, so as to make it convenient for the processor of the terminal to call and execute the operation steps corresponding to the receiving unit 500, detecting unit 600, determining unit 700 and synchronization unit 800.

For example, in the first embodiment of the terminal of the present disclosure (the embodiment shown in FIG. 7), the determining unit 700 is a processor of the terminal, the function of the receiving unit 500, detecting unit 600 and synchronization unit 800 may be embedded within the processor, or may be provided independently from the processor, or may be stored in software form within the processor for the processor to call and execute their function, which is not limited in any way by embodiments of the present disclosure, The above-mentioned processor may be a Central Processing Unit (CPU), a microprocessor or a single chip microcomputer.

Figure 8:
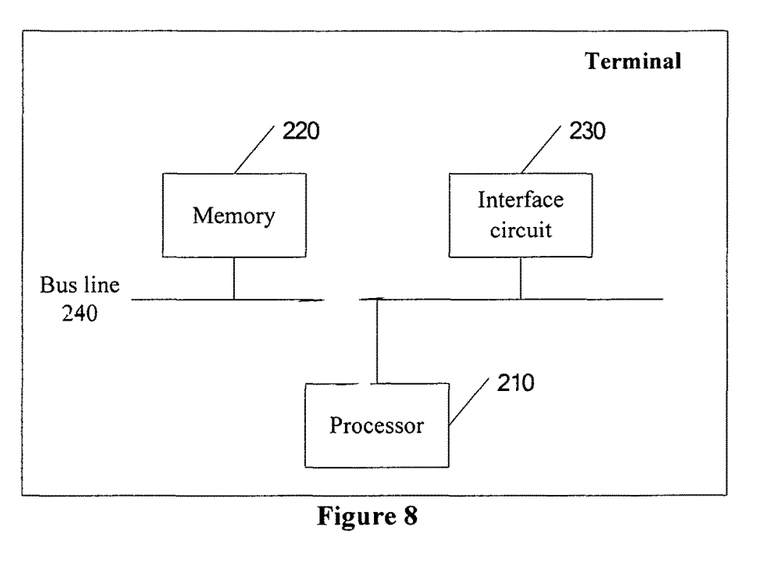
FIG. 8 is a component schematic diagram of a second embodiment of the terminal of the present disclosure.

Referring to FIG. 8 which is a component schematic diagram of a second embodiment of the terminal of the present disclosure, in this embodiment, the terminal comprises:

a processor 210, a memory 220 and an interface circuit 230 interconnected by a bus line 240, wherein, the memory 220 is for storing a group of program codes, the processor 210 is for calling the program codes stored in the memory 220 to execute the following operation steps:

using the interface circuit 230 to receive synchronization signal and physical broadcast channel sent by a base station, wherein, the subcarrier spacings and occupied symbol numbers of the synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table;

detecting the frequency domain positions and time domain positions of the received synchronization signal and physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal; completing downlink sub-frame synchronization according to the determined sub-frame boundary and symbol boundary with which the synchronization signal is sent.

It should be noted that, the respective embodiments in this description is described such a manner that a subsequently described embodiment focuses on the difference as compared to a previously described embodiment, and the identical or similar parts of the embodiments can be mutually referred to. For a device embodiment, because it is basically similar to a corresponding method embodiment, it is described in a relatively simple manner, and the related parts can refer to the corresponding parts described in the method embodiment.

As can be seen form the above-described embodiments, the present disclosure has the following advantages:

by configuring multiple types of subcarrier spacings and occupied symbol numbers to be selected from, the response flexibility when facing different services is improved, and the flexibility of resource utilization is improved; because the time domain positions and frequency domain positions thereof are relatively close to each other or even partially overlap or completely overlap, the terminal can quickly receive the two kind of information, quickly complete the search and synchronization for a community, so that the access time delay is reduced, which can be applied to various scenes and bring better using experience for users.

As can be understood by a person skilled in the art, all of or part of the steps in the above-described method embodiments can be implemented by related hardware with instructions of a computer program, the program can be stored in a computer readable storage medium, and when the program is executed, it performs the above-mentioned steps of the above-described method embodiments. Wherein, the storage medium may be a magnetic disk, an optic disk, a Read-Only Memory or a Random Access Memory.

The above disclosed is only preferred embodiments of the present disclosure, which is not intended for limiting the claim scope of the present disclosure, therefore, any equivalent variants based on the Claims of the present disclosure still belong to the protection scope covered by the present disclosure.

The invention claimed is:

1. An information transmission method, wherein, the method comprises:

configuring at least one type of subcarrier spacing of synchronization signal and physical broadcast channel and symbol numbers occupied by the synchronization signal and the physical broadcast channel by a base station, wherein, the subcarrier spacing of the synchronization signal is $15 \times 2^m$ kHz, the subcarrier spacing of the physical broadcast channel is $15 \times 2n$ kHz, m and n are both integers in a range of 0 to 5;

selecting one configuration for sending the synchronization signal and the physical broadcast channel according to a service time delay requirement;

determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

sending the synchronization signal and the physical broadcast channel to a terminal according to the selected configuration and the determined frequency domain positions and time domain positions.

2. The method of claim 1, wherein, the synchronization signal comprises primary synchronization signal and secondary synchronization signal, wherein, the primary synchronization signal occupies one symbol, the secondary synchronization signal occupies one symbol, the symbol occupied by the secondary synchronization signal is a previous and neighboring symbol of the symbol occupied by the primary synchronization signal;

or the symbol occupied by the secondary synchronization signal is the same as that occupied by the primary synchronization signal.

3. The method of claim 1, wherein, the physical broadcast channel occupies no more than 4 symbols, a starting symbol of the time domain for sending the physical broadcast channel is the $x^{th}$ symbol after the symbol for sending the secondary synchronization signal, wherein, X is 0 or 1.

4. The method of claim 2, wherein, length of unit symbols occupied by the primary synchronization signal, the secondary synchronization signal and the physical broadcast channel is determined by the subcarrier spacings configured, and if the subcarrier spacing of the primary synchronization signal and secondary synchronization signal is $15 \times 2^m$ kHz, the length of the unit symbol occupied by the primary synchronization signal and secondary synchronization signal is $1/(14 \times 2^m)$ milliseconds; if the subcarrier spacing of the physical broadcast channel is $15 \times 2^n$ kHz, the length of the unit symbol occupied by the physical broadcast channel is $1/(14 \times 2^n)$ milliseconds.

5. The method of claim 1, wherein, the step of configuring by a base station at least one type of subcarrier spacing of synchronized signal and physical broadcast channel and symbol numbers occupied by the synchronization signal and the physical broadcast channel comprises:

configuring at least one type of subcarrier spacing of synchronization signal and physical broadcast channel and symbol numbers occupied by the synchronization signal and the physical broadcast channel for each carrier frequency by the base station.

6. The method of claim 5, wherein, for the time domain positions for sending the synchronization signal and the physical broadcast channel at different carrier frequencies, the starting time points are the same; or
the finishing time points are the same; or
the middle time points are the same; or
based on a 0.5 millisecond time point in an 1 millisecond sub-frame, the secondary synchronization signal occupies one previous symbol of the 0.5 millisecond time point, and the primary synchronization signal occupies one subsequent symbol of the 0.5 millisecond time point.

7. The method of claim 1, wherein, the frequency domain positions for sending the synchronization signal and the physical broadcast channel are one or more resource blocks with no less than 1.08 MHz and no more than the minimal bandwidth supported by the base station, at least one of the resource blocks is at a band width central position.

8. The method of claim 7, wherein, for the frequency domain positions for sending the synchronization signal and the physical broadcast channel at different carrier frequencies, the starting frequency points are the same; or
the finishing frequency points are the same; or
the middle frequency points are the same.

9. The method of claim 7, wherein, if the carrier is an unauthorized carrier, the base station detects whether the signal channel bandwidth for sending the synchronization signal and broadcast signal is idle before sending the synchronization signal and broadcast signal, if it is detected that the signal channel bandwidth is idle, the synchronization signal and broadcast signal is sent; if it is detected that the signal channel bandwidth is not idle, the synchronization signal and broadcast signal is not sent on the channel bandwidth of the carrier.

10. The method of claim 1, wherein, after determining the frequency domain positions and time domain positions for sending the synchronization signal and the physical broadcast channel, the method further comprises:

generating a mapping term of subcarrier spacing, time length, starting time point, bandwidth size and starting frequency point for each configuration;

combining the generated mapping terms into a mapping table to be sent to the terminal for storage.

11. The method of claim 1, wherein, if the synchronization signal and the physical broadcast channel are sent by using multiple beams, each of the beams performs transmission independently.

12. The method of claim 11, wherein, if at least two beams use different time domains for transmission, assigning serial numbers to time blocks corresponding to the time domain positions determined; when each of the beams performs transmission, serial number information of the time block where the beam is located is carried.

13. The method of claim 1, wherein, if the base station works independently, a mapping table of resource information of random access channel and physical random access channel in relation with the space time frequency code information for sending the synchronization signal and the physical broadcast channel are stored in the terminal, and when the synchronization signal and the physical broadcast channel are received by the terminal, the terminal acquires the corresponding resource information of random access channel and physical random access channel by looking up the mapping table;

or the base station transmits the resource information of random access channel and physical random access channel through the physical broadcast channel.

14. The method of claim 1, wherein, the subcarrier spacing of the physical broadcast channel is larger than or equal to the subcarrier spacing of the synchronization signal at the same carrier frequency.

15. A base station, wherein, the base station comprises a processor, a memory and a transceiver interconnected by a bus line, wherein, the transceiver is for transmitting information and data between the base station and a terminal, the memory is for storing a group of program codes, the processor is for calling the program codes stored in the memory to execute the following operation steps:

configuring at least one type of subcarrier spacing of synchronization signal and physical broadcast channel and symbol numbers occupied by the synchronization signal and the physical broadcast channel, wherein, the subcarrier spacing of the synchronization signal is $15 \times 2^m$ kHz, the subcarrier spacing of the physical broadcast channel is $15 \times 2^n$ kHz, m and n are both integers in a range of 0 to 5;

selecting one configuration for sending the synchronization signal and the physical broadcast channel according to a service time delay requirement;

determining frequency domain positions and time domain positions of the synchronization signal and the physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

sending the synchronization signal and the physical broadcast channel to a terminal according to the selected configuration and the determined frequency domain positions and time domain positions.

16. A terminal, wherein, the terminal comprises a processor, a memory and an interface circuit interconnected by a bus line, wherein, the memory is for storing a group of program codes, the processor is for calling the program codes stored in the memory to execute the following operation steps:

using the interface circuit to receive synchronization signal and physical broadcast channel sent by a base station, wherein, the subcarrier spacings and occupied symbol numbers of the received synchronization signal and physical broadcast channel are selected by the base station from at least one type of predetermined configuration, the subcarrier spacing of the synchronization signal is $15 \times 2^m$ kHz, the subcarrier spacing of the physical broadcast channel is $15 \times 2^n$ kHz, m and n are both integers in a range of 0 to 5, each configuration has a corresponding mapping term of subcarrier spacing, time length, starting time point, bandwidth size and starting frequency point, and multiple mapping terms are combined into a mapping table;

detecting the frequency domain positions and time domain positions of the received synchronization signal and physical broadcast channel, wherein, the frequency domain positions for sending the synchronization signal and the physical broadcast channel are neighboring each other or at least partially overlap, the time domain positions for sending the synchronization signal and the physical broadcast channel are neighboring each other or partially overlap;

determining a sub-frame boundary and a symbol boundary with which the synchronization signal is sent, according to the measured frequency domain positions and time domain positions, in combination with the mapping relation read by the terminal from the mapping table which is received from the base station or pre-stored in the terminal;

completing downlink sub-frame synchronization according to the determined sub-frame boundary and symbol boundary with which the synchronization signal is sent.

* * * * *

UNITED STATES PATENT AND TRADEMARK OFFICE
CERTIFICATE OF CORRECTION

PATENT NO. : 10,291,457 B2
APPLICATION NO. : 15/795683
DATED : May 14, 2019
INVENTOR(S) : Mingju Li, Yajun Zhu and Yunfei Zhang Page 1 of 1

It is certified that error appears in the above-identified patent and that said Letters Patent is hereby corrected as shown below:

On the Title Page

Item (73) Assignee should read: NANCHANG COOLPAD INTELLIGENT TECHNOLOGY COMPANY LIMITED Signed and Sealed this
Twenty-third Day of July, 2019

Andrei Iancu
*Director of the United States Patent and Trademark Office*